Patented May 12, 1953

2,638,475

UNITED STATES PATENT OFFICE 2,638,475

SPRAY COOLED PRODUCT AND PROCESS

John Ross, Ramsey, N. J., assignor to Colgate-Palmolive-Peet Company, Jersey City, N. J., a corporation of Delaware No Drawing. Application October 6, 1948, Serial No. 53,141

5 Claims. (Cl. 260—398.5)

This invention relates to improvements in the spray processing of normally solid esters of fatty acids and aliphatic polyhydroxy compounds, and more particularly the solid partial esters of fatty acids and polyhydric alcohols.

In the manufacture of emulsions, creams, and various pharmaceutical and cosmetic preparations and the like, commercial use has been made of the solid partial esters of fatty acids and polyhydric alcohols, i. e. the glycol and glyceryl fatty acid esters, particularly the mono and di-stearates. These normally, wax-like solid esters are preferably converted into a convenient particle form so that they may be more easily transported and handled in the manufacture of such products. This is generally effected by heating the solid product until it is liquified and, while still in liquid condition, discharging the same as a spray into a sufficiently cool atmosphere to cause solidification of the spray droplets of the melted ester in the form of solid particles. The resulting spray-cooled product comprises fine particles of relatively uniform size, which particle size may be controlled by varying the nozzle pressure and conditions under which the particles are caused to solidify. For a more detailed description of a process for spray-cooling such solid fatty acid partial esters, reference may be made to the copending patent application of Harold Dwaine Allen, and Clarence Joseph Arrowsmith, Ser. No. 749,438, filed May 21, 1947.

These commercial fatty acid ester products usually contain impurities, such as unsaturated free fatty acids, which are readily oxidized, or function in some manner to catalyze a chemical reaction with any oxygen present to produce color bodies, or by-product carbonyl compounds, which tend to produce a product having an undesirable color or odor, or both. Such deleterious effects are accelerated during spray cooling of the product due to the exposure of the finely divided particles of the melted ester to oxidation at relatively high temperatures and under conditions conducive to oxidation or related chemical reactions which is undesirable.

Methods of removing unsaturated impurity constituents from these fatty acid ester substances which have been found practical, as by utilizing distillation and chemical methods, are expensive and increase the production cost of the finished product. Moreover, even using high purity esters, it is difficult to prevent oxidation or auto-oxidation from taking place during the heating and spray cooling treatment with the resultant production of a product which is of poor color and stability.

It has now been discovered, that an improved spray-cooled ester product can be produced from commercial grades of these partial esters of fatty acids and polyhydric alcohols without removing such unsaturated portions or impurities. The improved results are obtained by incorporating a small amount of an antioxidant or stabilizing agent. The addition agent functions both as an antioxidant, inhibiting oxidation of the ester during spray cooling, and as a stabilizing and preserving agent to provide a product having good color and chemical stability. The stabilizing agent may be added during the preparation of the fatty acid partial ester so that it becomes a constituent part thereof, or the same may be incorporated in the molten ester prior to spray cooling to produce a product in the form of discrete particles or pellets containing the preserving agent. Thus, in accordance with the present invention, a spray-cooled product composed of fatty acid partial esters of polyhydric alcohols is prepared which is markedly superior in color and chemical stability in comparison with a like product not spray cooled in the presence of such a preserving agent.

It is an important feature of the present invention to not only prevent oxidation of the ester but the formation of color bodies during the spray-cooling operation or during subsequent storage and use. By incorporating an effective amount of an antioxidant, which does not of itself cause discoloration, and carrying out the heating and spray cooling operations, it is possible to produce a fatty acid ester in the form of discrete, pourable particles or pellets which contains sufficient amount of the stabilizing agent evenly distributed throughout each particle to inhibit oxidative reactions and to effectively stabilize the same against darkening and deterioration during storage and use. The spray cooled product is of uniform white color, and can be stored in cartons or similar receptacles without fear of spoilage.

Insofar as known, no one heretofore has produced spray cooled fatty esters of this character wherein non-color producing antioxidant stabilizing substances are incorporated in the fatty ester prior to or during the spray-cooling process so as to produce a product in the form of discrete particles containing the stabilizing material evenly and uniformly distributed throughout each individual particle. In accordance with this invention, the improved results may be obtained by the incorporation of a relatively small percentage amount of a substance having antioxidant properties but no discoloration tendency in these normally solid partial esters of fatty acids and polyhydric alcohols prior to spray cooling. In this manner the fatty acid ester is not only protected from the oxidative effects otherwise produced during the heating and spray cooling operations, but in addition, the process results in the production of a finished spray cooled product which is lighter in color and more stable.

As stabilizing agents which may be used, the phenolic and hydroxy aromatic derivative compounds are effective. Tin oxide and its salts may also be used for this purpose. Examples of phenolic type compounds which may be used are isopropyl ortho cresol, n-propyl ortho cresol, monobutyl meta cresol, 4-6 ditertiary butyl-meta cresol, 2-6 ditertiary butyl para cresol, diamyl phenol, 5 methyl-2 isopropyl phenol, 1-hydroxy-2 methoxy-benzene, and the like compounds. Where a relatively non-toxic stabilizer is desired, as in the preparation of edible fatty esters, hydroxy benzene derivative compounds such as nordihydroguaiaretic acid may be utilized. The compounds may be used alone or in combination. Further, to enhance the stabilizing properties of the hydroxy aromatic compounds the addition of a trace of other substances having a synergistic effect may be made. For example, to the stabilizing agent there may be added 0.002% by weight citric or ascorbic acid, or a trace of phosphoric acid to produce this desired effect. The amount of stabilizer incorporated in the ester will depend upon the ester and the relative effectiveness of the stabilizing agent which it is desired to employ. In general, the amount used ranges from about 0.01 to 5% by weight of the ester. Preferably less than 1% is employed and ordinarily 0.2 to 0.5% is sufficient.

The preferred manner of carrying out the process, comprises thoroughly admixing the stabilizer with the fatty ester to be spray cooled, using an inert carrier if desired i. e. light mineral oil, after which the mixture is heated to form a melt. The fatty ester containing the stabilizing material and heated to a molten state is then sprayed as fine particles or droplets in a current of moving gas, generally air, to cool and solidify the ester in the form of discrete particles. Contact of the sprayed material with the moving gas rapidly cools the liquid particles of the ester producing a finished product in the form of discrete particles wherein the stabilizer is thoroughly and uniformly distributed throughout the same. A spray cooled ester product is thus produced which is of uniformly good color, and which does not darken or develop rancid odors when stored over long periods of time.

Although it is preferred to incorporate the stabilizer prior to spray-cooling to form the pellets of the fatty acid ester, the stabilizer may be incorporated concurrently during spray-cooling, as for example by uniformly dispersing therein a concentrate comprising a melt or a liquid mixture of said ester carrying the stabilizer so that the required amount of stabilizer is added to the melt to protect it against the oxidative effects to which it is subjected during spraying and cooling. A finished spray cooled product is thus produced which contains the required amount of stabilizing agent to prevent such detrimental oxidative effects from taking place during spraying as well as during subsequent storage and use.

The invention is particularly useful in stabilizing normally solid commercial fatty esters, such as mono and polyhydroxy fatty esters, during spray-cooling to form the same into small discrete particles, although the invention is not to be understood as limited specifically thereto. Examples of partial esters of fatty acids and polyhydric alcohols which may be spray cooled to form a stabilized product which is in the form of discrete particles, or pellets, are mono esters of glycol i. e. ethylene glycol monostearate, diethylene glycol monostearate, propylene glycol monostearate, ethylene glycol mono myristate, ethylene glycol mono laurate, diethylene glycol mono myristate, propylene glycol mono myristate; the diesters, i. e. ethylene glycol di-stearate; also glycerol esters i. e. glycerol monostearate, glycerol mono myristate, tallow monoglyceride and the like as well as the esters of unsaturated fatty acids such as oleic, linoleic, etc. and polyhydric alcohols. Mixtures of different fatty acid esters may also be utilized in making spray cooled products in accordance with the present invention.

The following examples illustrate how the invention may be utilized.

Example I

To a quantity of diethylene glycol mono stearate of commercial grade there is added 0.5% by weight of isopropyl ortho cresol. The ingredients are thoroughly admixed and heated to form a molten mass which is then formed into pellets by suitably spraying the molten mass into a current of moving air to cool and solidify the spray droplets of the fatty ester containing the stabilizer. The finished spray cooled product is of uniform light color and has improved stability against deterioration during storage and use.

Example II

To a quantity of ethylene glycol monostearate of commercial grade there is incorporated 0.3% by weight of n-propyl ortho cresol and the mixture is heated to form a molten mass which is sprayed to form pellets similarly as in Example I.

Example III

To a quantity of glycerol monostearate of commercial grade there is added 0.3% by weight of di-butyl meta cresol, and the fatty acid ester spray-cooled to form pellets similarly as in Example I.

Example IV

To fifty pounds of ethylene glycol mono myristate containing small amounts of impurities there is incorporated one-quarter of a pound of monobutyl meta cresol, and the mixture melted and spray cooled to form a product having discrete particles containing the cresol preservative.

Example V

To a quantity of ethylene glycol mono laurate of commercial grade, and which is to be spray cooled as in Example I, there is incorporated 0.2% by weight of isopropyl ortho cresol. The melted mixture is then subjected to spray cooling to form a pellet like mass having improved color and stability.

Example VI

To a quantity of diethylene glycol mono stearate containing small amounts of impurities there is added 0.5% by weight of 2-6 ditertiary butyl para cresol containing 0.002% by weight citric acid. The mixture is heated to a melting temperature and spray cooled to provide a finished product made up of discrete particles.

Example VII

To a quantity of refined bleached tallow monoglyceride there is incorporated 0.01% by weight of nordihydroguaiaretic acid containing 0.003% by weight of phosphoric acid, and the mixture heated to form a melt which is spray cooled as described in Example I. A pellet-like monoglycerol ester product of improved color and stability is produced which is edible, and which may be used in the preparation of various types of foodstuffs.

*Example VIII*

To a quantity of diethylene glycol mono stearate of commercial grade there is added 0.1% by weight tin stearate. The ingredients, after being thoroughly admixed, is heated to form a molten mass which is then subjected to spray cooling to form the ester into discrete particles as described in Example I.

*Example IX*

To a quantity of refined tallow monoglyceride there is incorporated 0.2% by weight tin oxide, the powder-like oxide being thoroughly admixed into the tallow while the same is heated to form a melt. The melted ester is then subjected to spray cooling to produce a finished product comprising discrete particles.

Although the invention has been described in detail, with specific examples given, such examples are understood to be merely illustrative and are not limitative thereof inasmuch as modifications and substitutions may be made within the spirit and scope of this invention, as will be apparent to those skilled in the art. Accordingly, the invention is limited as indicated in the appended claims.

What is claimed is:

1. A spray-cooled organic composition comprising solid pellets made up essentially of a normally solid partial ester of a fatty acid and an aliphatic polyhydroxy alcohol and containing a minor proportionate amount of a stabilizer consisting of an hydroxy aromatic derivative compound having a single benzene nucleus and an alkyl radical having up to 5 carbon atoms, said stabilizer amounting to 0.01 to 5% by weight of the spray cooled ester product and being uniformly distributed throughout each pellet.

2. The process which comprises heating normally solid partial esters of fatty acids and aliphatic polyhydroxy compounds to form a molten mass, admixing therewith a small percentage amount of a stabilizer having antioxidant properties consisting of an hydroxy aromatic derivative compound to stabilize the esters against oxidation and discoloration, said compound having a single benzene nucleus and an alkyl radical having up to 5 carbon atoms, and spraying the resulting mixture in fine droplet form into a cooled gaseous medium to solidify the same into solid discrete particles.

3. The process as set forth in claim 2 in which diamyl phenol is utilized as the stabilizer.

4. The process as set forth in claim 2 in which propyl cresol is utilized as the stabilizer.

5. The process as set forth in claim 2 in which butyl cresol is utilized as the stabilizer.

JOHN ROSS.

References Cited in the file of this patent

UNITED STATES PATENTS

| Number | Name | Date |
|---|---|---|
| 1,329,845 | Overbeck | Feb. 3, 1920 |
| 2,107,069 | Evans | Feb. 1, 1938 |
| 2,377,610 | Brown | June 5, 1945 |
| 2,407,616 | Phelps | Sept. 10, 1946 |
| 2,423,449 | Heald et al. | July 8, 1947 |
| 2,451,748 | Kraybill | Oct. 19, 1948 |
| 2,457,741 | Shipner | Dec. 28, 1948 |
| 2,511,803 | Hall | June 13, 1950 |